US 8,281,128 B2

(12) United States Patent
Lee et al.

(10) Patent No.: US 8,281,128 B2
(45) Date of Patent: Oct. 2, 2012

(54) METHOD AND APPARATUS FOR ENCRYPTING TRANSPORT STREAM OF MULTIMEDIA CONTENT, AND METHOD AND APPARATUS FOR DECRYPTING TRANSPORT STREAM OF MULTIMEDIA CONTENT

(75) Inventors: Choong-hoon Lee, Seoul (KR);
Jun-bum Shin, Suwon-si (KR);
So-young Lee, Hwaseong-si (KR);
Eun-hwa Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 536 days.

(21) Appl. No.: 12/509,675

(22) Filed: Jul. 27, 2009

(65) Prior Publication Data
US 2010/0195827 A1    Aug. 5, 2010

(30) Foreign Application Priority Data

Feb. 3, 2009    (KR) ........................ 10-2009-0008385

(51) Int. Cl.
*H04L 9/12* (2006.01)
*G06F 1/04* (2006.01)
(52) U.S. Cl. ............................. 713/160; 726/30; 380/42
(58) Field of Classification Search ........................ None
See application file for complete search history.

(56) References Cited

U.S. PATENT DOCUMENTS

| 6,944,299 | B1 * | 9/2005 | Mallela et al. | 380/262 |
| 6,980,650 | B2 * | 12/2005 | Wachtfogel et al. | 380/42 |
| 7,130,427 | B2 * | 10/2006 | Silverman et al. | 380/277 |
| 7,649,993 | B2 * | 1/2010 | Tsuchida | 380/203 |
| 2006/0147041 | A1 * | 7/2006 | Blasco Claret et al. | 380/29 |
| 2007/0113084 | A1 * | 5/2007 | Soda | 713/168 |
| 2007/0116290 | A1 * | 5/2007 | Yeh | 380/270 |
| 2008/0212775 | A1 * | 9/2008 | Mirsky et al. | 380/210 |

FOREIGN PATENT DOCUMENTS

KR    10-2002-0067599 A    8/2002

* cited by examiner

*Primary Examiner* — Venkat Perungavoor
(74) *Attorney, Agent, or Firm* — Sughrue Mion, PLLC

(57) ABSTRACT

A method of transporting an encrypted stream of multimedia content is provided. In the method, when a packet contains data of a predetermined length including selected data from pieces of data corresponding to the multimedia content and a header, key information, and first time information from among pieces of information included in a selected packet from among at least one packet are received, and encryption information is determined from the key information and the first time information, according to a key derivation function. The first time information is variable with time. The at least one packet including data corresponding to the multimedia content is encrypted using the encryption information. The at least one encrypted packet and the key information are transported.

28 Claims, 10 Drawing Sheets

| VALUE | MEANING |
|---|---|
| 00 | NOT ENCRYPTED |
| 01 | NOT ENCRYPTED |
| 10 | SCRAMBLED WITH EVEN-KEY INFORMATION |
| 11 | SCRAMBLED WITH ODD-KEY INFORMATION |

METHOD AND APPARATUS FOR ENCRYPTING TRANSPORT STREAM OF MULTIMEDIA CONTENT, AND METHOD AND APPARATUS FOR DECRYPTING TRANSPORT STREAM OF MULTIMEDIA CONTENT

CROSS-REFERENCE TO RELATED PATENT APPLICATION

This application claims priority from Korean Patent Application No. 10-2009-0008385, filed on Feb. 3, 2009, in the Korean Intellectual Property Office, the disclosure of which is incorporated herein in its entirety by reference.

BACKGROUND OF THE INVENTION

1. Field of the Invention

The present invention relates to encryption and decryption of a transport stream of multimedia content.

2. Description of the Related Art

A conditional access system (CAS) is used to protect broadcasting services such as services from an Internet Protocol TV (IPTV) provider or a cable TV provider, and thus provides security that enables only authorized service subscribers to use the services. To prevent unauthorized users from using the services, encryption involving three or more stages is performed on service streams. Information about encryption of each packet is inserted into a multimedia stream and is transported.

SUMMARY OF THE INVENTION

According to an aspect of the invention, there is provided a method and apparatus for encrypting or decrypting a transport stream of multimedia content using information included in the header of the transport stream.

According to an aspect of the present invention, there is provided a method of transporting an encrypted transport stream of multimedia content, the method including dividing a transport stream of the multimedia content into at least one packet; receiving key information, and first time information from information included in a selected packet from among the at least one packet, and determining encryption information from the key information and the first time information, according to a key derivation function, wherein the first time information is variable with time; encrypting the at least one packet using the determined encryption information; and transporting the at least one encrypted packet and the key information.

A cycle, in which the key information changes, may be shorter than a cycle, in which the first time information repeats. In the determining of the encryption information, non-periodical second time information is further received in addition to the key information and the first time information and encryption information may be determined from the key information, the first time information, and the non-periodical second time information, according to the key derivation function. The second time information is variable with time.

The transporting may further include transporting the second time information.

The determining of the encryption information may include determining the encryption information from the key information and a portion of the first time information, according to the key derivation function.

The encrypting of the at least one packet may include setting encryption change information that represents a similarity between first time information used to encrypt a previous packet and first time information used to encrypt a current packet; and encrypting the current packet comprising the first time information, selected data from among pieces of data corresponding to the multimedia content, and the encryption change information.

According to another aspect of the present invention, there is provided a method of decrypting a received encrypted stream of multimedia content, the method including receiving at least one encrypted packet of the multimedia content and key information; receiving selected key information from of the key information, and first time information from information included in a selected encrypted packet from the at least one encrypted packet, and determining encryption information from the selected key information and the first time information, according to a key derivation function, wherein the first time information is variable with time; decrypting the at least one encrypted packet using encryption information; and restoring the multimedia content using data corresponding to the multimedia content, which is included in the at least one decrypted packet.

The decrypting of the at least one encrypted packet may include reading encryption change information from the header of a current encrypted packet, wherein the encryption change information represents a similarity between first time information to decrypt a previous encrypted packet and first time information to decrypt the current encrypted packet; determining encryption information to decrypt the current encrypted packet, based on the encryption change information; and decrypting the current encrypted packet using the selected encryption information.

The restoring of the multimedia content may include restoring the multimedia content using portions of data corresponding to the multimedia content, which are included in the at least one decrypted packet.

According to another aspect of the present invention, there is provided an apparatus for transporting an encrypted stream of multimedia content, the apparatus including: a packet formation unit which divides a transport stream of the multimedia content into at least one packet; an encryption information determination unit which receives key information, and first time information from among pieces of information included in a selected packet from among the at least one packet, and which determines encryption information from the key information and the first time information, according to a key derivation function, wherein the first time information is variable with time; a packet encryption unit which encrypts the at least one packet using the encryption information; and a transportation unit which transports the at least one encrypted packet and the key information.

According to another aspect of the present invention, there is provided an apparatus for decrypting a received encrypted stream of multimedia content, the apparatus including: a reception unit which receives at least one encrypted packet for the multimedia content and at least one piece of key information; an encryption information determination unit which receives selected key information from among the at least one piece of key information, and first time information from among pieces of information included in a selected encrypted packet from among the at least one encrypted packet, and which determines encryption information from the selected key information and the first time information, according to a key derivation function, wherein the first time information is variable with time; a packet decryption unit which decrypts the at least one encrypted packets using the encryption information; and a multimedia content restoration unit which restores the multimedia content using portions of data corresponding to the multimedia content, which are included in the decrypted packets.

According to another aspect of the present invention, there is provided a computer-readable recording medium having recorded thereon a program for executing the method of transporting an encrypted transport stream of multimedia content.

According to another aspect of the present invention, there is provided a computer-readable recording medium having recorded thereon a program for executing the method of decrypting a received encrypted stream of multimedia content.

BRIEF DESCRIPTION OF THE DRAWINGS

The above and other features of the present invention will become more apparent by describing in detail exemplary embodiments thereof with reference to the attached drawings in which.

DETAILED DESCRIPTION OF EXEMPLARY
EMBODIMENTS OF THE INVENTION

Figure 1:
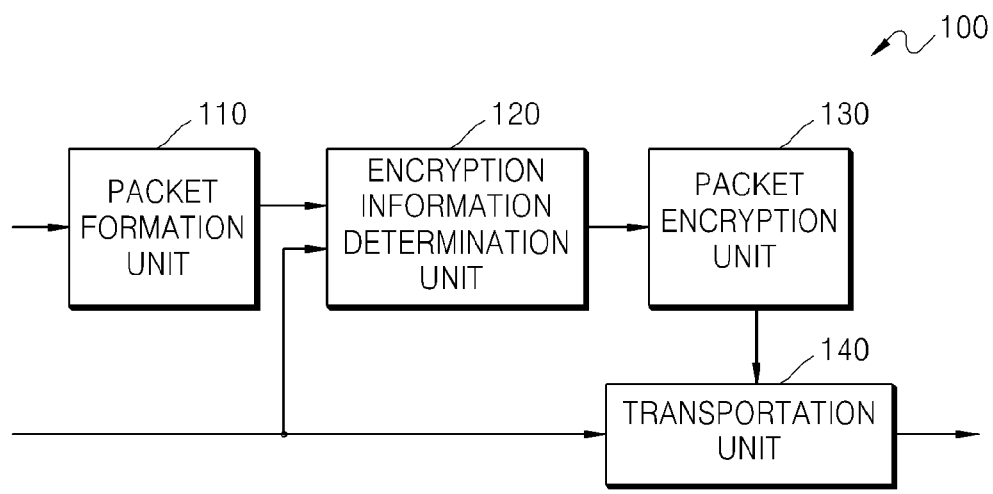
FIG. 1 is a block diagram of an encrypted multimedia stream transporting apparatus according to an exemplary embodiment of the present invention.

FIG. 1 is a block diagram of an encrypted multimedia stream transporting apparatus 100 according to an exemplary embodiment of the present invention.

Referring to FIG. 1, the encrypted multimedia stream transporting apparatus 100 includes a packet formation unit 110, an encryption information determination unit 120, a packet encryption unit 130, and a transportation unit 140.

The encrypted multimedia stream transporting apparatus 100 receives related data corresponding to multimedia content which is to be transported, and key information. The related data corresponding to the multimedia content may be data obtained by compressing the multimedia content.

The packet formation unit 110 forms a stream for transporting the received multimedia content, into packets. Each of the packets includes a header of predetermined size, and may further include a portion of the related data corresponding to the multimedia content. The packets are output to the encryption information determination unit 120.

The encryption information determination unit 120 receives key information and first time information which is included in a selected packet and is variable with time, and determines encryption information from the key information and the first time information, according to a key derivation function (KDF). The packets and the encryption information are output to the packet encryption unit 130.

In an exemplary embodiment, the multimedia content may be compressed according to a Motion Picture Experts Group (MPEG) encryption and decryption standard. Data obtained by compressing the multimedia content may be transported in the form of a MPEG transport stream (TS) packet. In this case, an example of the first time information may be program clock reference (PCR) information included in the header of the TS packet.

To improve the stability of security, a cycle in which the key information changes may be shorter than a cycle in which the first time information is repeated. Alternatively, the encryption information determination unit 120 may further receive second time information which is variable with time, in addition to the key information and the first time information, and determine the encryption information from the key information, the first time information, and the second time information, according to the KDF. The second time information may be non-cyclical.

The KDF may use only a portion of the first time information. The KDF may use selected information that includes the first time information included in the header of the TS packet. In other words, the KDF may use, as a first input, first time information, or a portion of the first time information, or information including the first time information, and may use, as a second input, key information or another piece of time information.

The KDF may be a message authentication code algorithm. For example, a keyed-Hash Message Authentication Code (HMAC) algorithm, a Cipher-based Message Authentication Code (CMAC) algorithm, or the like may be used as the KDF. The KDF may be a random number generator that generates a random number by using a value obtained by combining first time information and key information. If various combinations obtained from the first time information, the key information, and the second time information are input, various functions that output different result values may be used as the KDF.

The data obtained by compressing the multimedia content may be transported in the form of an MPEG program elementary stream (PES) packet. In this case, the first time information may be decoding time stamp (DTS) information or presentation time stamp (PTS) information which are included in the header of the MPEG PES packet. The DTS information denotes information about a point in time when a frame of the multimedia content inserted into the MPEG PES packet is to be decoded, and the PTS information denotes information about a point in time when the frame is to be played back.

The packet encryption unit 130 encrypts a current packet by using encryption information determined by the encryption information determination unit 120 and outputs the encrypted current packet to the transportation unit 140.

If the current packet includes first time information, the encryption information determination unit 120 may select, as the encryption information used to encrypt the current packet, encryption information determined using the first time information, which is included in the header of the current packet. On the other hand, if the current packet does not include first time information, the encryption information determination unit 120 may select, as the encryption information used to encrypt the current packet, encryption information determined using first time information, which is included in the header of a packet closest to the current packet from among previous packets and include first time information.

The encryption information determination unit 120 should determine which encryption information is to be used to encrypt the current packet from among pieces of encryption information determined using first time information included in the headers of packets. In an exemplary embodiment of the present invention, the encryption information determination unit 120 sets encryption change information representing a similarity between first time information used to encrypt a previous packet and first time information used to encrypt a current packet. The encryption change information may be inserted into the header of each packet.

For example, a current packet starts to be encrypted using the latest encryption information after previous packets are encrypted using encryption information previous to the latest encryption information. In this case, encryption change information pieces for the previous packets are set to have the same value, whereas encryption change information for the current packet is set to have a different value from the encryption change information for each of the previous packets.

The transportation unit 140 may transport the encrypted current packet obtained by the packet encryption unit 130 and the key information via a selected channel. If the encryption information determination unit 120 uses the second time information, the transportation unit 140 may transport not only the key information but also the second time information. The encrypted current packet and the key information may be transported in the same stream via the same channel or via different channels.

Since the encrypted multimedia stream transporting apparatus 100 generates encryption information from selected information included in a packet, an additional space for storing the encryption information is not needed in the packet. Therefore, the encrypted multimedia stream transporting apparatus 100 may efficiently utilize a network bandwidth and encrypt and transport a multimedia stream.

To improve the security of the first time information, which is variable with time, and the key information, the encryption information may be determined by using the second time information which is variable with time and non-periodical, and thus strong and effective encryption is possible.

Figure 2:
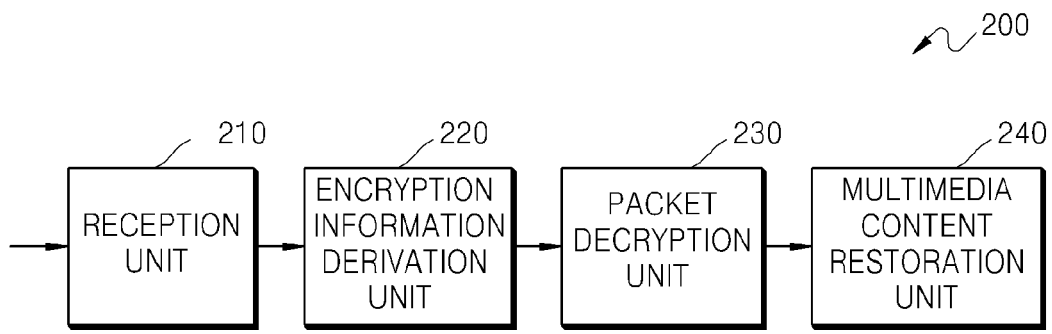
FIG. 2 is a block diagram of an encrypted multimedia stream decrypting apparatus according to an exemplary embodiment of the present invention.

FIG. 2 is a block diagram of an encrypted multimedia stream decrypting apparatus 200 according to an exemplary embodiment of the present invention.

Referring to FIG. 2, the encrypted multimedia stream decrypting apparatus 200 includes a reception unit 210, an encryption information derivation unit 220, a packet decryption unit 230, and a multimedia content restoration unit 240.

The reception unit 210 receives an encrypted stream of multimedia content. The received stream is a series of at least one encrypted packet. The reception unit 210 receives the at least one encrypted packet for the multimedia content and at least one piece of key information. The received packet and the received key information are output to the encryption information derivation unit 220.

The received key information may be the same as key information used to generate the received encrypted packet. Thus, the reception unit 210 may receive the key information used in the encrypted multimedia stream transporting apparatus 100 described above with reference to FIG. 1. The reception unit 210 may further receive the above-described second time information. The key information and the first and second time information may be received via a channel that is the same as the channel via which the packet is received, or via a channel that is different from the channel via which the packet is received.

The encryption information derivation unit 220 derives encryption information from first time information included in a selected packet and selected key information. The selected key information and the selected packet are received via the reception unit 210. A KDF of the encryption information derivation unit 220 may derive different pieces of encryption information according to a combination of first time information and key information. The encryption information is transported to the packet decryption unit 230.

If the reception unit 210 receives the second time information, the encryption information derivation unit 220 may derive encryption information from a combination of the first time information, the key information, and the second time information, according to the KDF. Similar to the first time information, the second time information may be the second time information used by the encrypted multimedia stream transporting apparatus 100.

The encryption information derivation unit 220 of the encrypted multimedia stream decrypting apparatus 200 should use a KDF having the same characteristics as the KDF used in the encryption information determination unit 120 of the encrypted multimedia stream transporting apparatus 100.

The first time information is information included in the received encrypted packets. To determine encryption information to be used to decrypt a current encrypted packet, first time information included in a decrypted packet previous to the current encrypted packet may be used.

In an MPEG system of the encrypted multimedia stream decrypting apparatus 200, if a packet is a TS packet, the first time information may be PCR information. If the packet is a PES packet, the first time information may be DTS information or PTS information.

The packet decryption unit 230 decrypts the encrypted packets received from the reception unit 210, by using the encryption information derived by the encryption information derivation unit 220. Related data corresponding to multimedia content, which is included in the decrypted packets, is output to the multimedia content restoration unit 240.

To determine encryption information to be used to decrypt a current packet, the packet decryption unit 230 may read encryption change information from the header of the current packet. The encryption change information represents a similarity between the encryption information used to decrypt the current packet and the encryption information used to decrypt a previous packet.

The packet decryption unit 230 determines encryption information to be used to decrypt the current packet, based on the encryption change information included in the current packet. In other words, if the encryption change information for the current packet is different from encryption change information for the previous packet, the current packet is not decrypted using encryption information used to decrypt the previous packet but by using encryption information derived subsequent to the encryption information for the previous packet by the encryption information derivation unit 220.

According to an exemplary embodiment, the current packet may be decrypted using encryption information derived according to the KDF by using key information and either first time information included in the header of the current packet or that included in the header of a packet closest to the current packet from among packets that are previous to the current packet and include first time information.

The multimedia content restoration unit 240 restores the multimedia content by using the related data corresponding to the multimedia content, which is inserted into the packets decrypted by the packet decryption unit 230.

Since at least one packet is received via the reception unit 210 and the packet decryption unit 230 decrypts each of the packets, the multimedia content restoration unit 240 may restore the multimedia content by using portions of the related data corresponding to the multimedia content, which are inserted into the packets, respectively.

Since decryption may be performed using information included in the headers of packets for the multimedia content, a transmission end may minimize illegal access while transporting minimal additional information associated with encryption, and a reception end may stably decrypt encrypted data packets.

Figure 3:
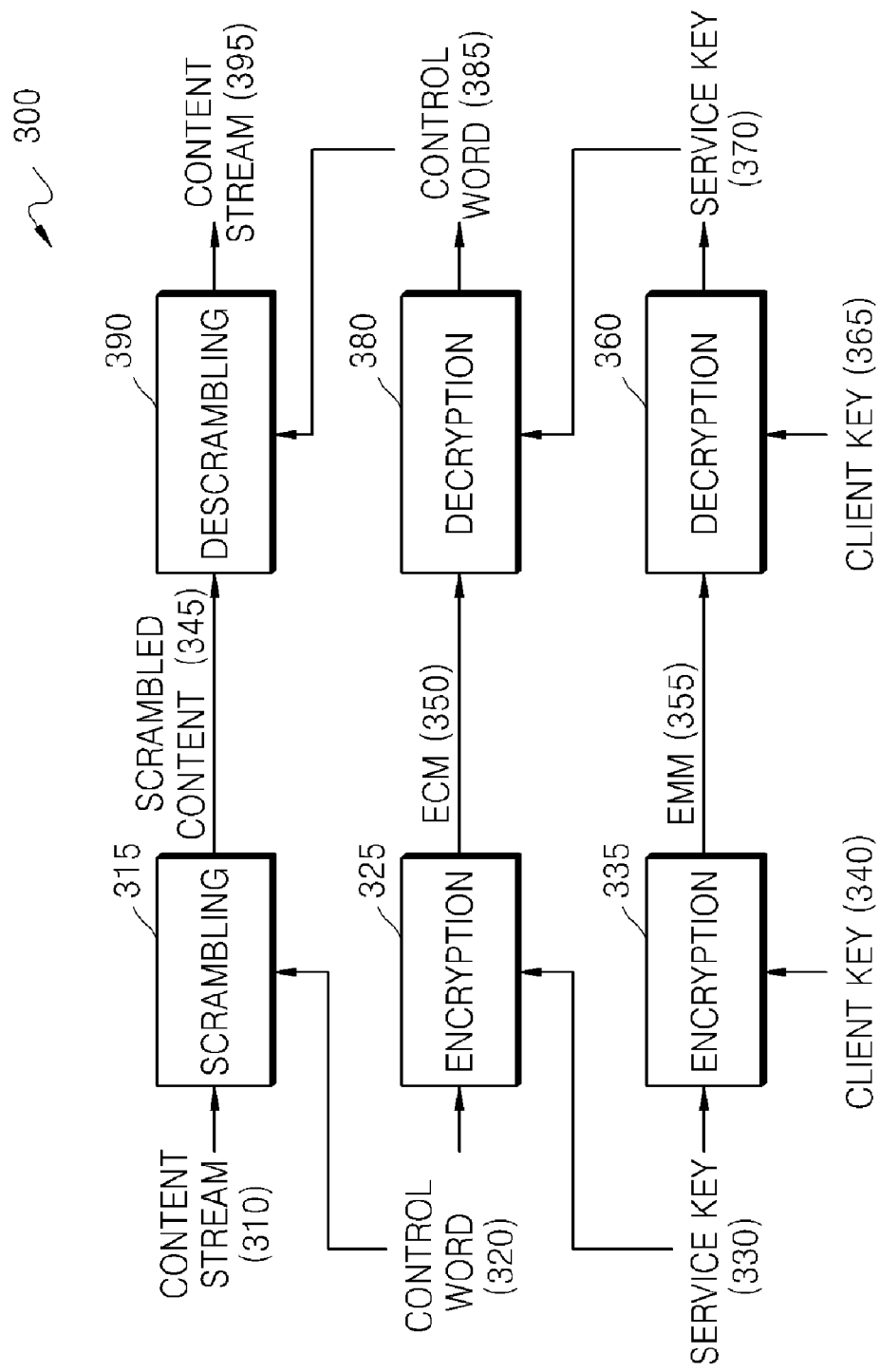
FIG. 3 is a block diagram for explaining a method in which an existing conditional access system (CAS) encrypts and decrypts content.

FIG. 3 is a block diagram for explaining a method 300 in which an existing conditional access system (CAS) encrypts and decrypts content.

FIG. 3 illustrates a method of protecting services by encrypting and providing content according to the CAS and allowing only authorized subscribers to decrypt the encrypted content.

In the transmission end, a content stream 310 is scrambled using a control word 320 in operation 315, and scrambled content 345 is transported. The control word 320 is encrypted using a service key 330 in operation 325 and transported in the form of a message structure unique to a CAS, such as, an entitlement control message (ECM) 350. The service key 330 is encrypted using a client key 340 in operation 335 and transported in the form of a message structure unique to the CAS, such as, an entitlement management message (EMM) 355.

Accordingly, since the content stream 310, the control word 320, and the service key 330 are encrypted, the content stream 310 is triply encrypted and transported. The ECM 350 is generally included in the scrambled content 345 and transported via the same channel as that via which the scrambled content 345 is transported, whereas the EMM 355 may be transported via a channel that is the same as or different from the channel via which the scrambled content 345 is transported.

The reception end receives the scrambled content 345, the ECM 350, and the EMM 355. In the reception end, the EMM 355 received via an EMM channel is decrypted using a client key 365 in operation 360, and thus a service key 370 is restored. The received ECM 350 is decrypted using the service key 370 in operation 380, and thus a control word 385 is restored. The scrambled content 345 is descrambled using the control word 385 in operation 390, and thus a content stream 395 is restored.

The service key 330 is transported in the form of the EMM 355 to only a client who has purchased content so that only clients having the client key 365 decrypt the service key 370. Consequently, a content stream 395 may be restored and displayed.

The control words 320 and 385 and the service keys 330 and 370 are changed periodically. Generally, a cycle in which the control words 320 and 385 change is longer than a cycle in which the service keys 330 and 370 change.

Figure 4:
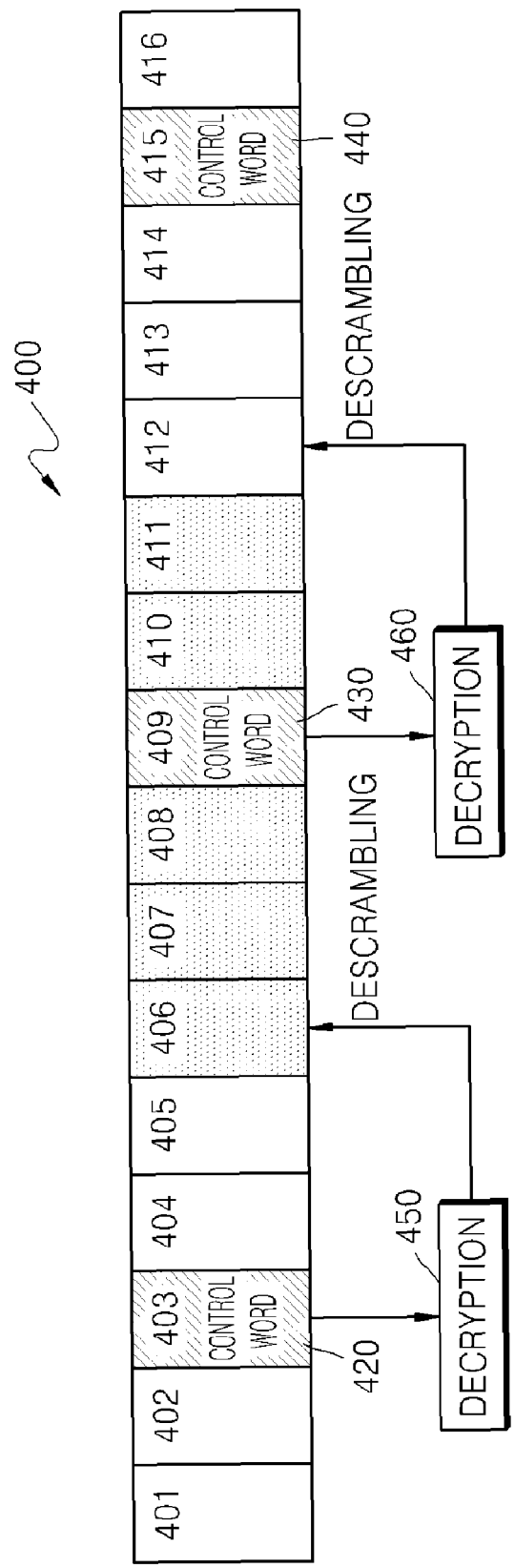
FIG. 4 illustrates a structure of a stream used in the existing CAS.

FIG. 4 illustrates a structure of a stream 400 used in the existing CAS.

The stream 400 has a structure used in a TS-based CAS, being a transport steam. TS packets 401, 402, 403, 404, 405, 406, 407, 408, 409, 410, 411, 412, 413, 414, 415, and 416 of the transport stream 400 are encrypted using control words 420, 430, and 440. The control words 420, 430, and 440 are included in the form of the ECMs in TS packets 403, 409, and 415, respectively, from among the TS packets 401 through 416 and transported together with a content stream included in the transport stream 400.

A decryption end decrypts ECMs in the TS packets 403 and 409 in operations 450 and 460, respectively, so as to obtain the control words 420 and 430, which are used to descramble selected packets. For example, if the control word 420 is used to descramble the TS packets 406, 407, 408, 409, 410, and 411, the control word 430 may be used to descramble the TS packets 412, 413, 414, 415, and 416.

Since a TS packet including an ECM should be transported at least every time a control word is changed, a change cycle of the control word may be the same as a transport cycle of the TS packet including an ECM. When a new stream is received, such as when a channel change happens, a TS packet including an ECM may be re-transported in a cycle faster than the change cycle of the control word in order to achieve fast decryption.

Referring to FIGS. 3 and 4, since the CAS should re-transport a TS packet including an ECM in a short cycle in order to provide a control word for encrypting a content stream to clients, additional network bandwidth is required. Therefore, when a network bandwidth is not enough, additional transportation of a TS packet including an ECM may reduce transportation efficiency of a multimedia content stream.

In general, an IPTV system has insufficient network bandwidth and many different types of traffic, compared with a broadcasting service system that uses an exclusive network, such as a cable TV system, an airwave TV system, or the like. Therefore, if network bandwidth is not sufficient, additional transportation of TS packets including ECMs may be fatal in terms of providing services.

Figure 5:
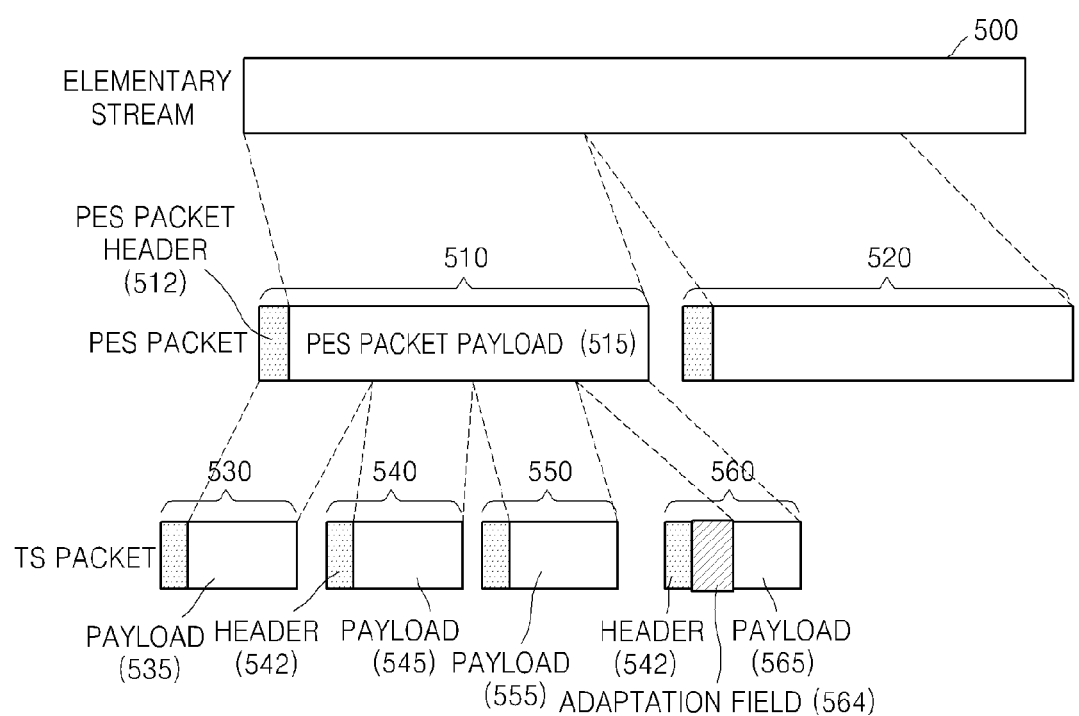
FIG. 5 illustrates a structure of an elementary stream which is used in a motion picture experts group (MPEG) system.

FIG. 5 illustrates a structure of an elementary stream 500 of a compressed video or audio stream, which is used in an MPEG system. In the MPEG system, the elementary stream 500 may be packetized into PES packets 510 and 520. The PES packet 510 may be made up of a PES packet header 512 and a PES packet payload 515. The PES packet payload 515 includes a part of the elementary stream 500. The PES packet header 512 may include DTS information or PTS information.

The PES packet 510 may be formed in units of 184 bytes and included in payloads 535, 545, 555, and 565 of TS packets 530, 540, 550, and 560, respectively, so as to be transported. The TS packet 540 may be made up of a header 542 and the payload 545. The TS packet 560 may be made up of a header 562, the payload 565, and an adaptation field 564. A structure of a TS packet will now be described with reference to FIG. 6.

Figure 6:
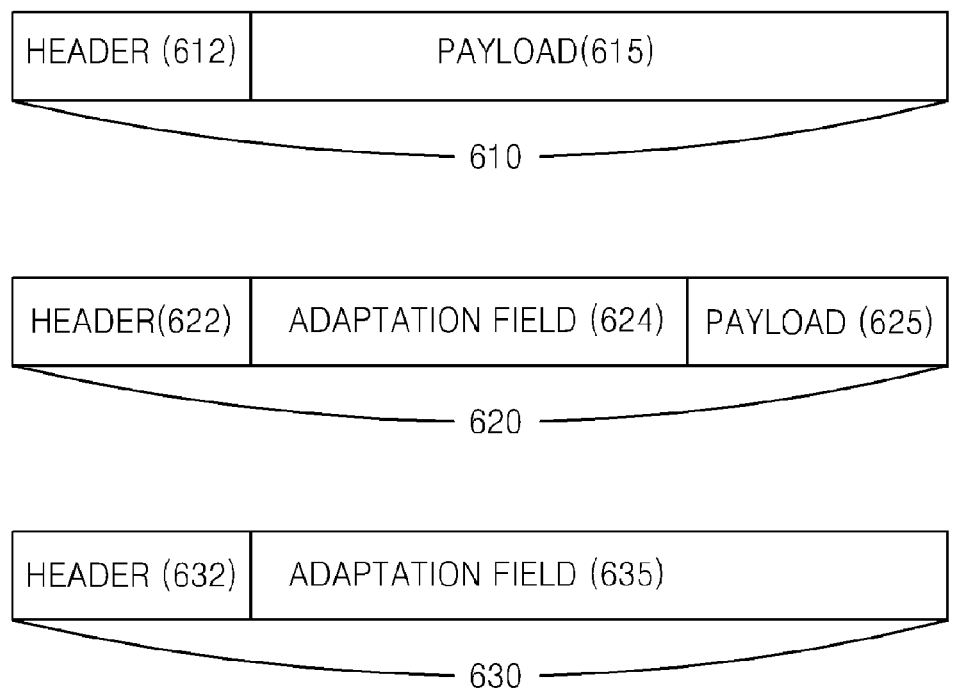
FIG. 6 illustrates a structure of a transport stream (TS) packet of the MPEG system.

FIG. 6 illustrates TS packet structures which are used in the MPEG system. A TS packet 610 may include a header 612 and a payload 615. A TS packet 620 may include a header 622, an adaptation field 624, and a payload 625. A TS packet 630 may include only a header 632 and an adaptation field 635. The TS packets 610, 620, and 630 may be each 188 bytes, and the headers 612, 622, and 632 may be each 4 bytes.

Each of the payloads 615 and 625 may include a PES packet that contains data related to actual content, such as a video or audio stream, or program specific information (PSI) that represents information about a program included in a stream.

The headers 612, 622, and 632 include values that identify types and characteristics of the TS packets 610, 620, and 630, such as, program identifiers (PIDs).

The adaptation fields 624 and 635 may include extended header information other than basic information included in the headers 612, 622, and 632.

PCR information included in the headers 612, 622, and 632 or in the adaptation fields 624 and 635 is a value which is used in the MPEG system in order to perform clock synchronization between a server and a client. For example, the value of the PCR information continuously changes according to the flow of time for a decoding system having a reference clock of 27 MHz.

Figure 7:
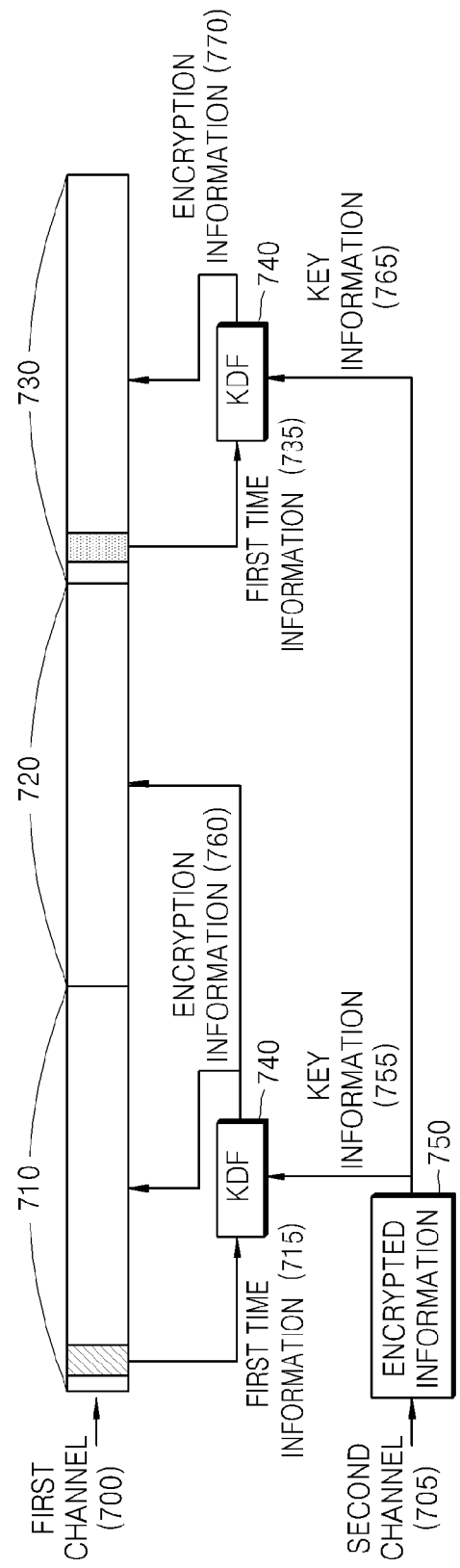
FIG. 7 illustrates a method of encrypting or decrypting a TS packet by using header information and key information, according to an exemplary embodiment of the present invention.

FIG. 7 illustrates a method of encrypting or decrypting a TS packet by using header information and key information, according to an exemplary embodiment of the present invention. Referring to FIG. 7, the encryption information determination unit 120 of the encrypted multimedia stream transporting apparatus 100 inputs first time information 715 included in a header or an adaptation field of a packet 710 and key information 755 to a KDF 740 and derives encryption information 760.

Since the packet 710 includes the first time information 715, the packet encryption unit 130 may encrypt the packet 710 by using the encryption information 760 derived using the first time information 715. Since a packet 720 does not include first time information, the packet 720 may be encrypted using the encryption information 760 derived using the first time information 715 of the previous packet 710.

Since a packet 730 also includes first time information 735, the packet encryption unit 130 generates encryption information 770, according to the KDF 740, which has received key information 765 and the first time information 735, and encrypts the packet 730 using the encryption information 770.

If the first time information 715 and the first time information 735 have different values, the encryption information 760 and the encryption information 770 may have different values. Although the pieces of key information 755 and 765 have the same value due to a long change cycle, the pieces of encryption information 760 and 770 may have different values due to a short cycle in which each of the pieces of first time information 715 and 735 is repeated. Thus, security of the encryption information 760 and the encryption information 770 may be improved.

The transportation unit 140 of the encrypted multimedia stream transporting apparatus 100 may transport results of the encryption of the packets 710, 720, and 730 via a first channel 700, encrypt the pieces of key information 755 and 765, and transport results of the encryption of the pieces of key information 755 and 765 via a second channel 705.

The reception unit 210 of the encrypted multimedia stream decrypting apparatus 200 may receive an encrypted content stream corresponding to the results of the encryption of the packets 710, 720, and 730 via the first channel 700 and encrypted key information 750 via the second channel 705.

The encrypted key information 750 may be decrypted using information having a value unique to each user, such as, a client key, and thus the pieces of key information 755 and 765 may be restored. The encryption information determination unit 220 of the encrypted multimedia stream decrypting apparatus 200 uses the KDF 740 used in the encrypted multimedia stream transporting apparatus 100. The KDF 740 receives the pieces of first time information 715 and 735 included in the packets 710 and 730 and the pieces of key information 755 and 765 and derives the pieces of encryption information 760 and 770.

Since the packets 710 and 730 include the pieces of first time information 715 and 735, respectively, the packet decryption unit 230 decrypts the packets 710 and 730 by using the pieces of encryption information 760 and 770 derived using the pieces of first time information 715 and 735 and the pieces of key information 755 and 765. Since the packet 720 does not include first time information, the packet 720 may be decrypted using the encryption information 760 which has been most recently derived.

Encryption information may correspond to a control word in a CAS. First time information for a TS packet may correspond to one from among PCR information included in the header of the TS packet, a part of the PCR information, and a portion of the header, the portion including the PCR information. Key information may correspond to a service key in the CAS, and a second channel via which encrypted key information is transported may correspond to an EMM channel.

The KDF may receive a combination of key information Key and PCR information PCR and output a control word CW according to Equation 1:

$$CW = KDF(Key, PCR) \quad (1)$$

Since the encrypted multimedia stream transporting apparatus 100 uses the KDF, a transportation terminal such as a server and a reception terminal, such as a client, may generate the same encryption information.

Accordingly, the transportation terminal may encrypt a content stream and the reception terminal may restore the content stream, by using the first time information that periodically changes like a control word changes, and that is included in a packet, even without transporting an ECM packet including a control word.

Since the first time information having a shorter change cycle than key information such as a service key is used, encryption information that changes in a short cycle, that is, changes frequently, is generated, and a content stream is encrypted using the frequently changing encryption information. Therefore, security may be improved compared with a method of encrypting a stream using the service key.

Figure 8:
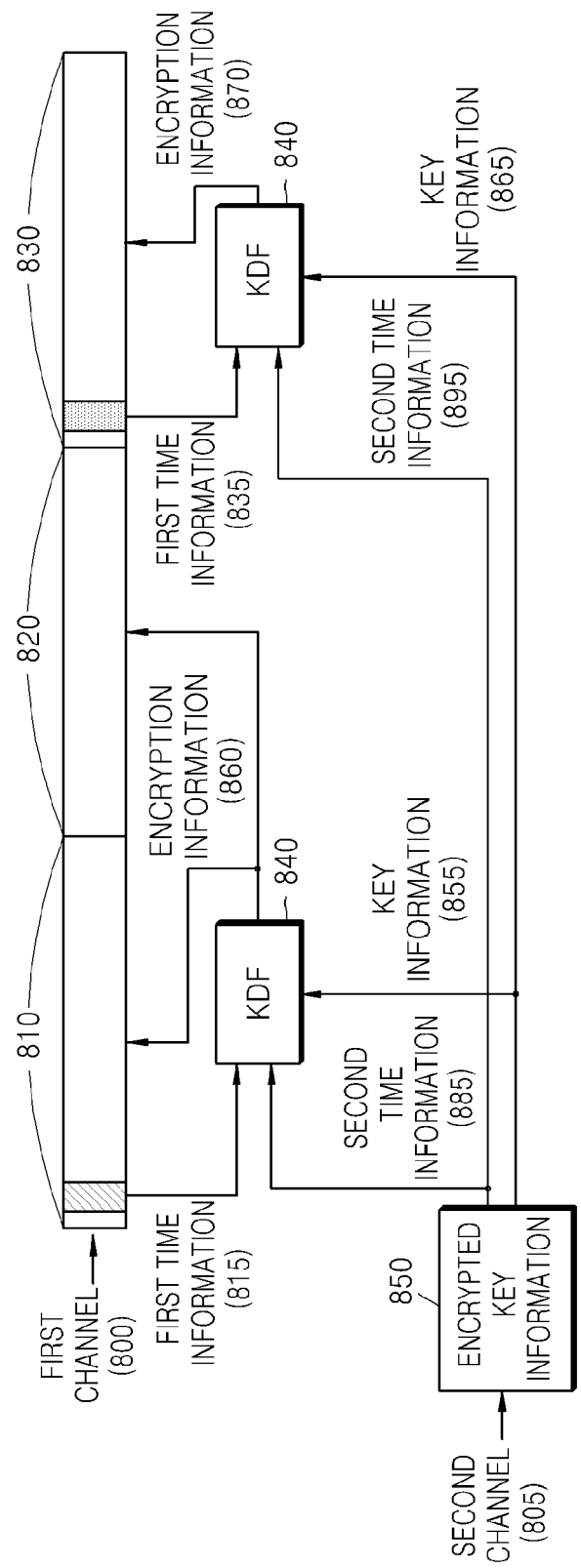
FIG. 8 illustrates a method of encrypting or decrypting a TS packet by using header information, key information, and time information, according to an exemplary embodiment of the present invention.

FIG. 8 illustrates a method of encrypting or decrypting a TS packet by using header information, key information, and time information, according to an exemplary embodiment of the present invention.

Since first time information, such as PCR information, has periodicity although a repetition cycle is not long, the first time information may be somewhat predictable. Thus, to lower the probability that encryption information is predicted, encryption information may be generated by additionally using second time information that is variable with time and is still non-periodical.

The second time information may have a value representing a current instant of time or a value which does not repeat periodically. A cycle in which encrypted key information and the second time information are transported via a second channel may be shorter than a cycle in which the first time information is repeated.

Referring to FIG. 8, the encryption information determination unit 120 of the encrypted multimedia stream transporting apparatus 100 inputs first time information 815 included in a header or an adaptation field of a packet 810, key information 855, and second time information 885 to a KDF 840 and derives encryption information 860.

The packet encryption unit 130 may encrypt the packet 810 and a packet 820 by using the encryption information 860 derived using the first time information 815, the key information 855, and the second time information 885. The packet encryption unit 130 encrypts a packet 830 by using encryption information 870 derived using key information 865, second time information 895, and first time information 835.

The transportation unit 140 of the encrypted multimedia stream transporting apparatus 100 may transport results of the encryption of the packets 810, 820, and 830 via a first channel 800. Also, the transportation unit 140 may encrypt the pieces of key information 855 and 865 and the pieces of second time information 885 and 895, and transport results of the encryption of the pieces of key information 855 and 865 and the pieces of second time information 885 and 895 via a second channel 805.

The reception unit 210 of the encrypted multimedia stream decrypting apparatus 200 may receive an encrypted content stream corresponding to the results of the encryption of the packets 810, 820, and 830 via the first channel 800 and encrypted key information 850, which includes the results of the encryption of the pieces of key information 855 and 865 and the pieces of second time information 885 and 895, via the second channel 805.

The encrypted key information 850 may be decrypted, and thus the pieces of key information 855 and 865 and the pieces of second time information 885 and 895 may be restored. The KDF 840 receives the pieces of first time information 815 and 835 included in the packets 810, 820, and 830, the pieces of key information 855 and 865, and the pieces of second time information 885 and 895 and derives the pieces of encryption information 860 and 870.

A KDF may receive a combination of key information Key, a current instant of time TIME, and PCR information PCR and output a control word CW according to Equation 2:

$$CW = KDF(Key, PCR \| TIME) \qquad (2)$$

where the concatenation operator '$\|$' denotes a value obtained by combining a value of the PCR information and a value of the information TIME.

The packets 810 and 830 are decrypted by the packet decryption unit 230 by using the pieces of encryption information 860 and 870, respectively, determined using the pieces of first time information 815 and 835, respectively, and the pieces of key information 855 and 865, respectively. Since the packet 820 does not include first time information, the packet 820 may be decrypted using the encryption information 860 which has been most recently generated.

As illustrated in FIG. 8, encryption information is generated using additional non-periodical second time information in order to lower a possibility that the encryption information will be predicted due to the periodic repetition of the first time information, therefore a multimedia stream can be firmly encrypted.

The packet encryption unit 130 of the encrypted multimedia stream transporting apparatus 100 may encrypt the current packet by using the encryption information determined according to a combination of the first time information, the key information, and the second time information. If the current packet does not include a payload, the encryption information used to encrypt the current packet may be used to encrypt the next packet. Similarly, the packet decryption unit 230 of the encrypted multimedia stream decrypting apparatus 200 may decrypt the current packet by using the encryption information determined according to a combination of the first time information, the key information, and the second time information. If the current packet does not include a payload, the encryption information used to decrypt the current packet may be used to decrypt the next packet. In other words, a point in time when the encryption information is determined according to the first time information may be almost the same as that when the encryption information is used for packet encryption or decryption.

In order to secure a period of time during which the encryption information is determined according to the KDF, the determined encryption information may first be used at a location a selected distance apart from a location in the stream that includes first time information used to determine the encryption information. This will now be described in greater detail with reference to FIG. 9.

Figure 9:
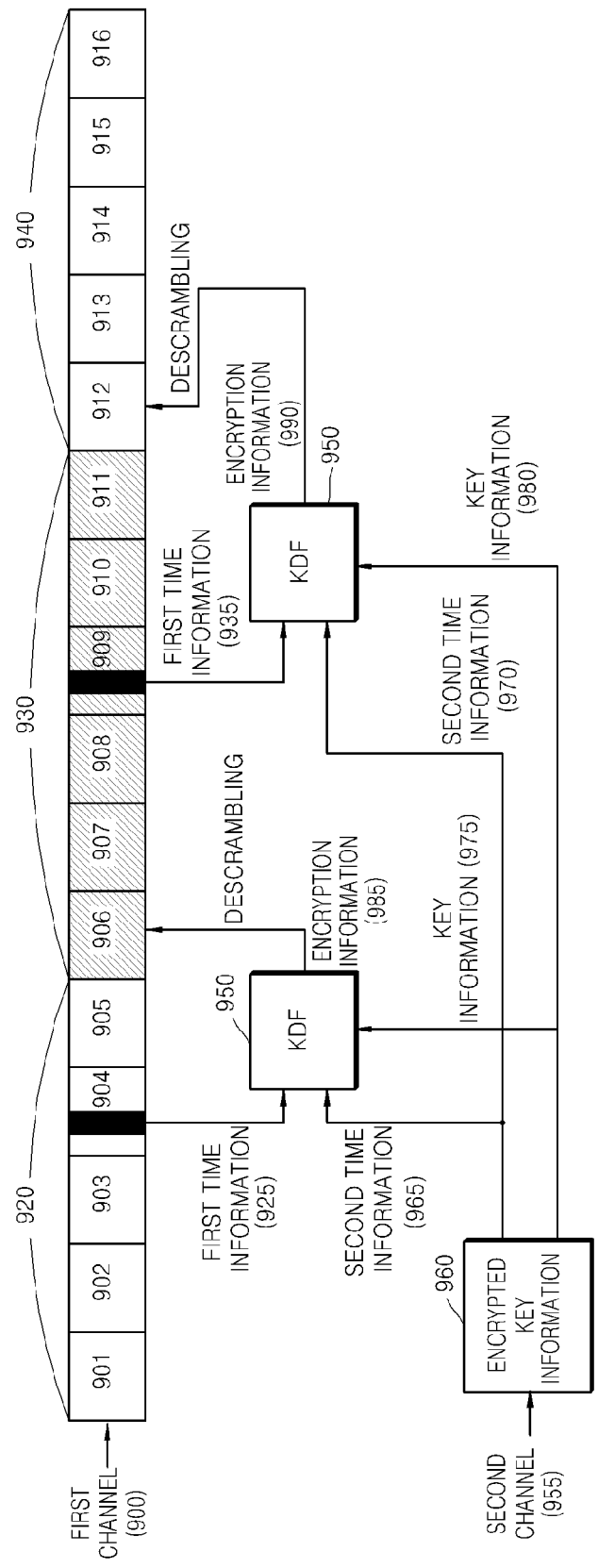
FIG. 9 illustrates a method of determining a point in time when determined encryption information is applied, according to an exemplary embodiment of the present invention.

FIG. 9 illustrates a method of determining a point in time when determined encryption information is used, according to an exemplary embodiment of the present invention.

Referring to FIG. 9, packets 901, 902, 903, 904, 905, 906, 907, 908, 909, 910, 911, 912, 913, 914, 915, and 916 are encrypted and transported via a first channel 900. The packets 901 through 916 may each include encryption change information that represents encryption information necessary for encryption or decryption.

For example, the encryption change information may be even-key information or odd-key information. Setting of encryption change information included in a packet may alternate between even-key information and odd-key information every time encryption information for use in encryption and decryption of a current packet is changed from encryption information used in encryption and decryption of a previous packet.

Referring to FIG. 9, encryption information 985 determined using first time information 925, key information 975, and second time information 965 of the packet 903, according to a KDF 950, is even-key information. Encryption information 990 determined using first time information 935, key information 980, and second time information 970 of the packet 909, according to the KDF 950, is odd-key information.

If a packet group 930 is encrypted using the encryption information 985 by the packet encryption unit 130 of the encrypted multimedia stream transporting apparatus 100, encryption change information for the packet group 930 is set as even-key information. If a packet group 940 is encrypted using the encryption information 990 by the packet encryption unit 130 of the encrypted multimedia stream transporting apparatus 100, encryption change information of the packet group 940 is set as odd-key information.

Although not shown in FIG. 9, a packet group 920 is encrypted using previous encryption information that is different from the encryption information 985 used for the packet group 930, and thus encryption change information of the packet group 920 is set as odd-key information that is opposite to encryption change information of the packet group 930.

The packet 906, which is the first packet in the packet group 930, includes encryption change information that is different from the packets included in the packet group 920, which are previous to the packet 906. In other words, encryption change information for the packet 906 represents the fact that the packet 906 is a packet encrypted first by using the encryption information 985, which is different from encryption information used to encrypt the packet group 920 previous to the packet 906.

Similarly, the packet 912, which is the first packet in the packet group 940, includes encryption change information that is different from the packets included in the packet group 930, which are previous to the packet 912. In other words, encryption change information for the packet 912 represents the fact that the packet 912 is a packet encrypted first by using the encryption information 990, which is different from the encryption information 985 used to encrypt the packet group 930 previous to the packet 912.

The packet decryption unit 230 of the encrypted multimedia stream receiving apparatus 200 may determine whether even-key information is used for decryption, by checking the encryption change information for the encrypted packet group 930. Accordingly, the packet decryption unit 230 may restore the packet group 930 by using the encryption information 985, which is even-key information and has been most recently determined.

Similarly, the packet decryption unit 230 of the encrypted multimedia stream receiving apparatus 200 may determine whether odd-key information is used for decryption, by checking the encryption change information for the encrypted packet group 940. Accordingly, the packet decryption unit 230 may restore the packet group 940 by using the encryption information 990, which is odd-key information that has been most recently determined.

The results of the encryption of pieces of key information 975 and 980 are transported via a second channel 955. The reception unit 210 of the encrypted multimedia stream decrypting apparatus 200 may receive an encrypted content stream corresponding to the results of the encryption of the packets 920, 930, and 940 via the first channel 900 and encrypted key information 960.

Accordingly, although a point in time when encryption information is determined does not coincide with when the determined encryption information is used, a multimedia stream may be encrypted and decrypted at precise points in time by using encryption change information.

Figures 10, 11:
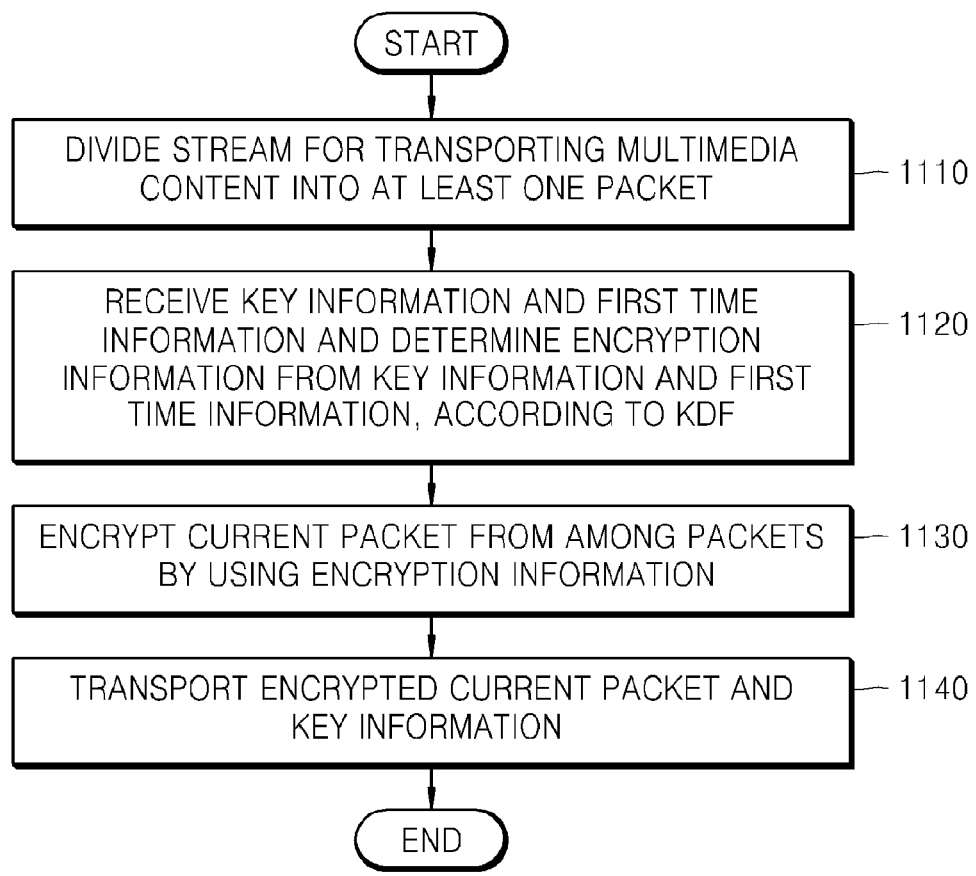
FIG. 10 illustrates encryption change information according to an exemplary embodiment of the present invention.
FIG. 11 is a flowchart of an encrypted multimedia stream transporting method according to an exemplary embodiment of the present invention.

FIG. 10 illustrates encryption change information according to an exemplary embodiment of the present invention.

The encrypted content stream transporting apparatus 100 and the encrypted content stream decrypting apparatus 200 may use, as encryption change information, scrambling control field (SCF) information which is 2-bit information included in the header of a TS packet of an MPEG system.

The SCF information is associated with encryption and decryption of a TS packet including an SCF corresponding to the SCF information. In an Advanced Television Systems Committee (ATSC) standard, which provides an extension to an MPEG system, the SCF information is defined by four values and is used to represent a control word that is used to encrypt a corresponding packet. If the SCF information is '00', it represents that a corresponding TS packet has not been encrypted. If the SCF information is '10', it represents that the corresponding TS packet has been encrypted using the control word of even-key information. If the SCF information is '11', it represents that the corresponding TS packet has been encrypted using the control word of odd-key information. A value '01' of the SCF information is a reserved allocated bit that can be defined later.

The encrypted content stream transporting apparatus 100 and the encrypted content stream decrypting apparatus 200 may use the SCF information. In other words, in the encrypted content stream transporting apparatus 100, when even-key information and odd-key information are alternately set as the encryption information changes, if most recently determined even-key information is used as encryption information in order to encrypt a selected packet, SCF information included in the selected packet may be set to be even-key information of '10'. Likewise, if most recently determined odd-key information is used as the encryption information in order to encrypt the selected packet, the SCF information included in the selected packet may be set to be odd-key information of '11'.

FIG. 11 is a flowchart of an encrypted multimedia stream transporting method according to an exemplary embodiment of the present invention.

In operation 1110, a stream for transporting multimedia content is divided into at least one packet. If the multimedia content according to the present exemplary embodiment is transported in an MPEG system, the stream for transporting the multimedia content may be compressed according to an MPEG compression method and be divided into TS packets or PES packets.

In operation 1120, key information and first time information which is variable with time from among pieces of information included in a selected packet from among the packets are received, and encryption information is determined from the key information and the first time information, according to a KDF. To improve the security of the multimedia content, a cycle, in which the key information changes, may be shorter than a cycle, in which the first time information is repeated, or non-periodical second time information may be additionally combined with the key information and the combination may be input to the KDF.

In operation 1130, a current packet from among the packets is encrypted using encryption information. If the current packet includes no first time information, the current packet may be encrypted using encryption information determined using first time information included in a packet closest to the current packet from among packets that are previous to the current packet and include respective first time information. On the other hand, if the current packet includes first time information, the current packet may be encrypted using encryption information determined using the included first time information. Even when the previous packet includes the first time information, a point in time when the encryption information is determined may be synchronized with a point in time when the encryption information is used, by using an encryption information signal in order to secure a period of time during which the encryption information is determined. The key information (and the second time information) may be encrypted.

In operation 1140, the encrypted current packet and the key information are transported. When encrypted packets are consecutively transported via a first channel, the encrypted key information may be transported via the first channel together with the encrypted packets. The encrypted key information may be transported separately from the encrypted packets via a second channel.

Figure 12:
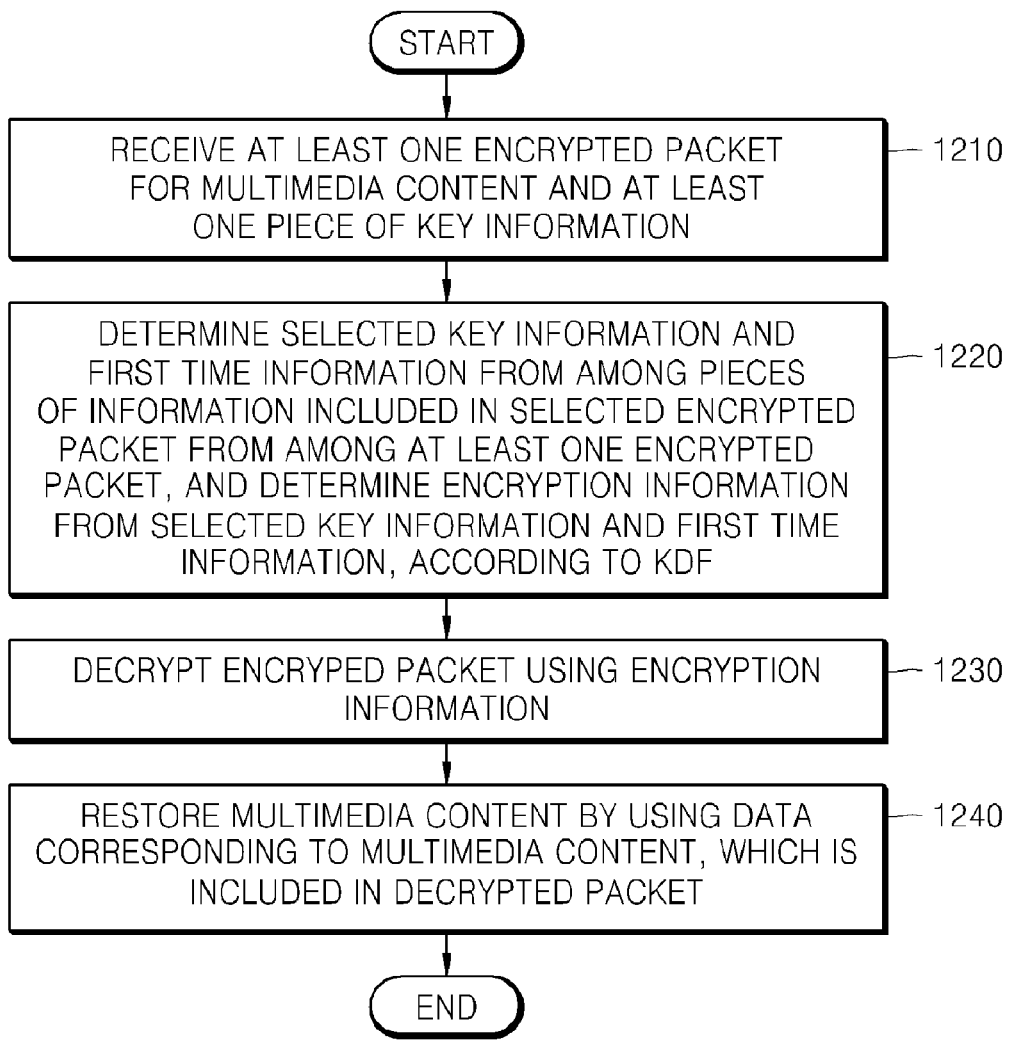
FIG. 12 is a flowchart of an encrypted multimedia stream decrypting method according to an exemplary embodiment of the present invention.

FIG. 12 is a flowchart of an encrypted multimedia stream decrypting method according to an exemplary embodiment of the present invention.

In operation 1210, at least one encrypted packet for multimedia content and at least one piece of key information are received. The encrypted packet and the key information may be received via an identical channel or via different channels.

In operation 1220, selected key information from among the received pieces of key information, and first time information variable with time from among pieces of information included in a selected encrypted packet from among the received encrypted packets are received, and encryption information is determined from the selected key information and the first time information, according to a KDF. The KDF must be the same as the KDF described above with reference to FIG. 11. If second time information is received along with the key information, the first time information and a combination of the key information and the second time information are input to the KDF, and thus encryption information is generated from the key information, the second time information, and the first time information.

In operation 1230, the encrypted packets are decrypted using encryption information. Encryption information determined using first time information included in a current encrypted packet may be used to decrypt the current encrypted packet or to decrypt next encrypted packets. When a point in time when the encryption information is determined is different from a point in time when the encryption information is used, encryption information to be used for decryption may be determined using encryption change information included in the header of a packet.

In operation 1240, the multimedia content is restored using the related data corresponding to the multimedia content, which is included in the decrypted packets. More specifically, the multimedia content may be restored by restoring all portions of the related data corresponding to the multimedia content, which are inserted into the payloads of the decrypted packets.

The exemplary embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), and optical recording media (e.g., CD-ROMs, or DVDs).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A machine-implemented method of transporting an encrypted transport stream of multimedia content, the method comprising:
    dividing a transport stream of the multimedia content into a plurality of packets;
    receiving key information and first time information from information included in a selected packet from among the plurality of packets;
    determining encryption information from the key information and the first time information, according to a key derivation function,
    wherein the first time information is variable with time;
    encrypting the plurality of packets using the determined encryption information; and
    transporting the plurality of encrypted packets and the key information,
    wherein the determining the encryption information comprises selecting, as encryption information for a current packet, one of encryption information determined according to the key derivation function using the first time information included in a header of the current packet and the key information, and encryption information determined according to the key derivation function using the key information and the first time information included in a header of a packet closest to the current packet from among packets previous to the current packet and include the first time information.

2. The method of claim 1, wherein a cycle in which the key information changes, is shorter than a cycle in which the first time information repeats.

3. The method of claim 1, wherein the determining the encryption information comprises:
    receiving non-periodical second time information in addition to the key information and the first time information; and
    determining encryption information from the key information, the first time information, and the non-periodical second time information, according to the key derivation function, and
    wherein the second time information is variable with time.

4. The method of claim 3, further comprising transporting the second time information.

5. The method of claim 1, wherein the determining the encryption information comprises determining the encryption information from the key information and a portion of the first time information, according to the key derivation function.

6. The method of claim 1, wherein the encryption information is determined from the key information and a portion of a header of the selected packet, according to the key derivation function, and
    wherein the portion of the header comprises the first time information.

7. The method of claim 1, wherein the first time information comprises program clock reference (PCR) information for clock synchronization between a server and a client, and
    wherein the plurality of packets comprises a transport stream (TS) packet.

8. The method of claim 1, wherein the first time information is at least one of decoding time stamp (DTS) information regarding a point in time when frames of the multimedia content inserted the plurality of packets should be decoded, and presentation time stamp (PTS) information regarding a point in time when the frames should be played back, and
    wherein the plurality of packets are a program elementary stream (PES) packet.

9. The method of claim 1, wherein the encrypting the plurality of packets comprises:
    setting encryption change information representing a similarity between first time information which encrypts a previous packet and first time information which encrypts a current packet; and
    encrypting the current packet comprising the first time information, selected data from among data corresponding to the multimedia content, and the encryption change information.

10. The method of claim 1, wherein the key derivation function is one of a predetermined message authentication code algorithm and a random number generation function.

11. The method of claim 1, wherein the key derivation function outputs a variable result according to a combination of input values.

12. The method of claim 1, wherein the key information and the encrypted packet are transported via different channels.

13. A machine-implemented method of decrypting a received encrypted stream of multimedia content, the method comprising:
    receiving a plurality of encrypted packets of the multimedia content and key information;
    receiving selected key information from the key information, and first time information from information included in a selected encrypted packet from among the plurality of encrypted packets;
    determining encryption information from the selected key information and the first time information, according to a key derivation function,
    wherein the first time information is variable with time;

decrypting the plurality of encrypted packets using the determined encryption information; and restoring the multimedia content using data corresponding to the multimedia content, which is included in the at least one decrypted packet, wherein the determining the encryption information comprises selecting, as encryption information for a current packet, one of encryption information determined according to the key derivation function using the first time information included in a header of the current packet and the key information, and encryption information determined according to the key derivation function using the key information and the first time information included in a header of a packet closest to the current packet from among packets previous to the current packet and include the first time information.

14. The method of claim 13, wherein a cycle in which the key information changes, is shorter than a cycle in which the first time information repeats.

15. The method of claim 13, further comprising:
receiving second time information that is variable with time and is non-periodical; and
determining the encryption information from the selected key information, the first time information, and the second time information, according to the key derivation function.

16. The method of claim 13, further comprising determining the encryption information from the key information and a portion of the first time information, according to the key derivation function.

17. The method of claim 13, wherein the determining the encryption information comprises:
determining the encryption information from the key information and a portion of a header of the selected encrypted packet, according to the key derivation function, and
wherein the portion of the header comprises the first time information.

18. The method of claim 13, wherein the first time information comprises program clock reference (PCR) information for clock synchronization between a server and a client, and
wherein the plurality of packets comprises a transport stream (TS) packet.

19. The method of claim 13, wherein the first time information is one of decoding time stamp (DTS) information regarding a point in time when frames of the multimedia content inserted into the plurality of packets should be decoded, and presentation time stamp (PTS) information regarding a point in time when the frames should be played back, and
wherein the plurality of packets comprises a program elementary stream (PES) packet.

20. The method of claim 13, wherein the decrypting the plurality of encrypted packets comprises:
reading encryption change information from a header of a current encrypted packet,
wherein the encryption change information represents a similarity between first time information which decrypts a previous encrypted packet and first time information which decrypts the current encrypted packet;
determining encryption information to decrypt the current encrypted packet, based on the encryption change information; and
decrypting the current encrypted packet using the selected encryption information.

21. The method of claim 13, wherein the key derivation function comprises one of a predetermined message authentication code algorithm and a random number generation function.

22. The method of claim 13, wherein the key derivation function outputs a variable result according to a combination of input values.

23. The method of claim 13, wherein the at least one key information and the plurality of encrypted packets are received via different channels.

24. The method of claim 13, wherein the multimedia content is restored using portions of data corresponding to the multimedia content, which are included in the at least one decrypted packet.

25. An apparatus for transporting an encrypted stream of multimedia content, the apparatus comprising:
a packet formation unit which divides a transport stream of the multimedia content into a plurality of packets;
an encryption information determination unit which receives key information, and first time information from information in a selected packet from the plurality of packets, and which determines encryption information from the key information and the first time information, according to a key derivation function,
wherein the first time information is variable with time;
a packet encryption unit which encrypts the plurality of packets using the encryption information; and
a transportation unit which transports the plurality of encrypted packets and the key information,
wherein the encryption information determination unit selects, as encryption information for a current packet, one of encryption information determined according to the key derivation function using the first time information included in a header of the current packet and the key information, and encryption information determined according to the key derivation function using the key information and the first time information included in a header of a packet closest to the current packet from among packets previous to the current packet and include the first time information, and
wherein at least one of the packet formation unit, the encryption information determination unit, the packet encryption unit, and the transportation unit is implemented as a hardware component.

26. An apparatus for decrypting a received encrypted stream of multimedia content, the apparatus comprising:
a reception unit which receives a plurality of encrypted packets for the multimedia content and key information;
an encryption information determination unit which receives selected key information from of the key information, and first time information from information included in a selected encrypted packet from the plurality of encrypted packets, and which determines encryption information from the selected key information and the first time information, according to a key derivation function;
wherein the first time information is variable with time,
a packet decryption unit which decrypts the plurality of encrypted packets using the encryption information; and
a multimedia content restoration unit which restores the multimedia content using portions of data corresponding to the multimedia content, which are included in the decrypted packets,
wherein the encryption information determination unit selects, as encryption information for a current packet, one of encryption information determined according to the key derivation function using the first time information included in a header of the current packet and the key information, and encryption information determined according to the key derivation function using the key information and the first time information included in a header of a packet closest to the current packet from among packets previous to the current packet and include the first time information, and wherein at least one of the reception unit, the encryption information determination unit, the packet decryption unit, and the multimedia content restoration unit is implemented as a hardware component.

27. A non-transitory computer-readable recording medium having recorded thereon a program for executing a method, the method comprising:

dividing a transport stream of the multimedia content into a plurality of packets;

receiving key information and first time information from information included in a selected packet from among the plurality of packets;

determining encryption information from the key information and the first time information, according to a key derivation function, wherein the first time information is variable with time;

encrypting the plurality of packets using the determined encryption information; and transporting the plurality of encrypted packets and the key information, wherein the encryption information determination unit selects, as encryption information for a current packet, one of encryption information determined according to the key derivation function using the first time information included in a header of the current packet and the key information, and encryption information determined according to the key derivation function using the key information and the first time information included in a header of a packet closest to the current packet from among packets previous to the current packet and include the first time information.

28. A non-transitory computer-readable recording medium having recorded thereon a program for executing a method, the method comprising:

receiving a plurality of encrypted packets of the multimedia content and key information;

receiving selected key information from the key information, and first time information from information included in a selected encrypted packet from among the plurality of encrypted packets;

determining encryption information from the selected key information and the first time information, according to a key derivation function, wherein the first time information is variable with time;

decrypting the plurality of encrypted packets using the determined encryption information; and restoring the multimedia content using data corresponding to the multimedia content, which is included in the at least one decrypted packet, wherein the encryption information determination unit selects, as encryption information for a current packet, one of encryption information determined according to the key derivation function using the first time information included in a header of the current packet and the key information, and encryption information determined according to the key derivation function using the key information and the first time information included in a header of a packet closest to the current packet from among packets previous to the current packet and include the first time information.

* * * * *